United States Patent [19]
Anello et al.

[11] Patent Number: 5,826,853
[45] Date of Patent: Oct. 27, 1998

[54] POST PROTECTOR

[75] Inventors: Salvatore Anello, Fishkill; Albert F. Diaz, Lynbrook, both of N.Y.

[73] Assignee: Sandt Technology, Ltd., Marlboro, N.Y.

[21] Appl. No.: 703,060

[22] Filed: Aug. 26, 1996

[51] Int. Cl.⁶ .................................................. F16M 13/00
[52] U.S. Cl. .......................... 248/552; 248/551; 248/553; 70/161
[58] Field of Search .................................... 248/552, 551, 248/553; 70/DIG. 72, 159, 160, 161; 312/100

[56] References Cited

U.S. PATENT DOCUMENTS

| | | | |
|---|---|---|---|
| 1,026,649 | 5/1912 | Beshore | 70/161 |
| 1,634,884 | 7/1927 | Peer | 248/551 |
| 1,660,822 | 2/1928 | Tait | 70/161 |
| 2,615,322 | 10/1952 | Gazda | 70/DIG. 72 |
| 4,940,296 | 7/1990 | McGough | 248/553 |
| 5,076,531 | 12/1991 | Delaney | 248/552 |
| 5,133,528 | 7/1992 | Vogl et al. | 248/551 |
| 5,170,907 | 12/1992 | Sakai | 248/553 |

*Primary Examiner*—Victor N. Sakran
*Attorney, Agent, or Firm*—Joseph B. Taphorn

[57] ABSTRACT

Two embodiments are shown for protecting the pedestal of a public payphone against vandalism. Both employ a stainless steel plate. Both also employ techniques for protecting the stainless steel plate against vandalism. In one, a U-shaped structure and bar is utilized. In the other, internal bars and a cam control are employed.

20 Claims, 7 Drawing Sheets

POST PROTECTOR

INTRODUCTION

1. Field of the Invention

This invention relates to posts or pedestals for public coin-operated telephones, and more particularly to devices for rendering the interior of the posts or pedestals more secure from vandalism.

2. Background of the Invention

Front-opening posts or pedestals for public coin-operated telephones mount the payphones in their upper portions above steel dividers separating the lower portions. Wiring for electrically powering the pedestal and phone and for connecting the payphone in the telephone system enter the pedestal from its bottom. Connections to the payphone are made within the lower portion A rectangular aluminum sheet for protecting the wiring is mounted across the front opening of the lower portion to close it off. It is mounted by six screws, three on each side, which are threadedly received in a rim formed about the lower or base portion front opening.

Vandals are removing or destroying the aluminum sheet. They remove the sheet to sell it for its metal worth. They destroy it to enter the lower portion to ground the ring side of telephone wire so that the relay switch of the coin return mechanism is held in the coin hold position allowing the vandal to later remove the ground and recover the coins which should have been returned to the unsuccessful telephone caller who deposited the coins. They also destroy it to tap the wire for A/C electrical power.

3. Prior Art

The only prior art known is the substitution of stainless steel sheets for the aluminum ones. The simple substitution of a stainless steel sheet for the aluminum one has not been found to be an acceptable solution.

SUMMARY OF THE INVENTION

Accordingly it is an object of the invention to provide a device for adequately protecting the wiring in the base of a public coin-operated-telephone pedestal against vandalism.

A more specific object of the invention is to devise a structure for securely mounting a protective stainless steel plate in place.

A further object of the invention is to devise a structure which is easy of installation and easy of removal by qualified technicians.

Another object of the invention is to devise such a structure such which is simple and inexpensive of manufacture.

The objects of the invention are achieved by mounting near the bottom of the inside surface of the stainless steel plate an offset bracket which allows the steel plate to be snugly seated on the lower portion of the rim surrounding the opening, and near the top of the inside surface of the stainless steel plate a shelf bracket which is snugly received below the upper portion of the rim surrounding the opening. The offset bracket and the shelf bracket prevent the stainless steel bracket from being worked up and down by vandals after the screws for normally holding the protective sheet in place have been removed.

Sidewise and outwards jockeying of the protective stainless steel plate is prevented by a pedestal wrap-around stainless steel apparatus consisting of a U-shaped member secured at its bight portion to the protective stainless steel plate and pivotally mounting at the end of one of its bight portions a stainless steel plate that extends beyond the end of the other bight portion to receive in a hole formed in it a protuberance extending from the end of the other bight portion and slotted to constitute the staple that receives the U-shaped bar of a padlock.

In a second embodiment, slotted shelf brackets are welded to the top, bottom and side edges of the inside surface of the stainless steel plate to prevent up and down and sidewise jockeying of the stainless steel plate. The slotted brackets receive the outer ends of bars which are moved to positions behind the rim to secure the stainless steel plate against outward movement. The bars are simultaneously moved outwards to the securing position by a slotted circular or disk cam receiving laterally extending pins on the inner end of them. The circular cam is fixed upon a slotted shaft turned from outside the plate by the standard "T" telephone key carried by many telephone company employees. Applicants prevent turning of the circular cam and slotted shaft by vandals by mounting a horizontally extending staple on the front surface of the steel plate and that is received within a lock (Federal 400D) which extends downward to cover the slotted shaft to prevent insertion therein of a "T" key equivalent and its effective use to unlock the steel plate for removal.

A feature of this invention is that applicants have successfully combined three (3) securing mechanisms on a plate blocking access to elements behind it, to thwart vandals. Thus besides the screws normally employed to hold the plate in place, brackets on the inside surface of the plate prevent the jockeying of it to where it becomes sufficiently loose to enable prying of it open, and either an external hinged wrap-around component embracing the pedestal or an internal lateral-bars-extending arrangement preventing outward movement of the plate.

BRIEF DESCRIPTION OF DRAWINGS OF EMBODIMENTS OF THE INVENTION

These and other objects, features and advantages of the invention will become apparent from a reading of the following descriptions, when considered with the appended drawings, of two preferred embodiments of the invention:

Figure 3:
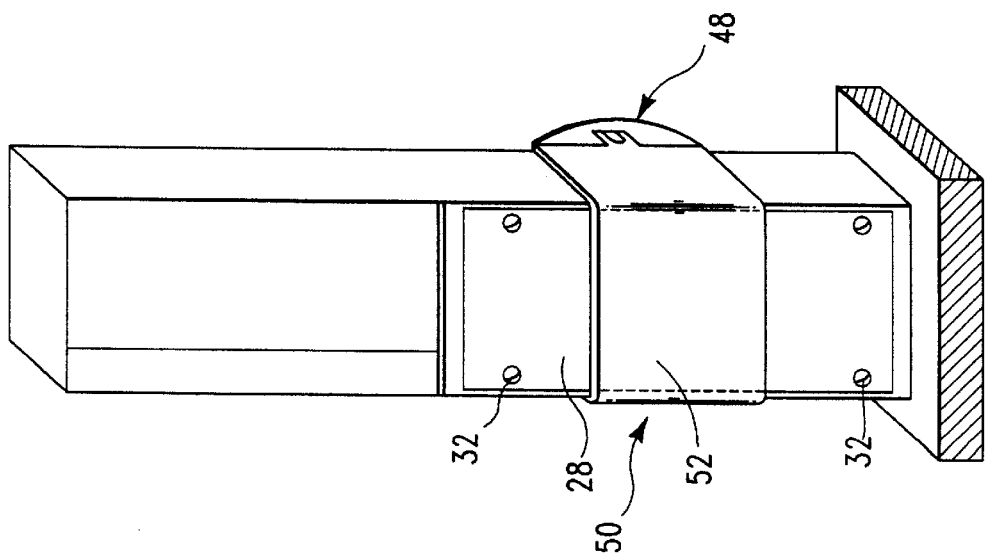
FIG. 3 is a diagrammatic front view in perspective of a pedestal and apparatus using a tough cover and an integral band to replace the conventional pedestal lower-opening cover to better secure the pedestal wiring against vandalism.
Figure 7:
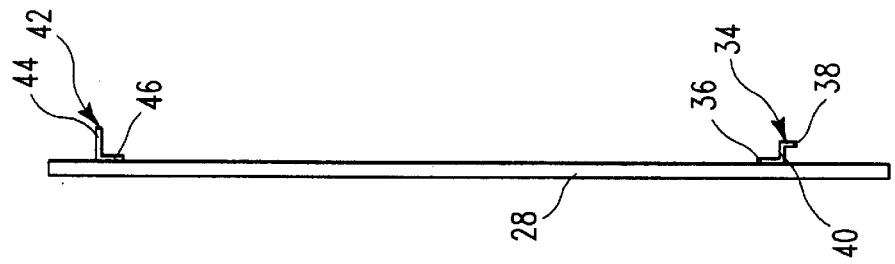
Figure 6:
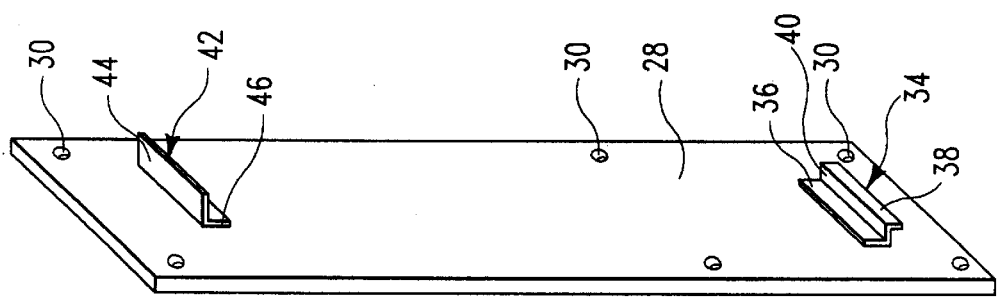
Figure 5:
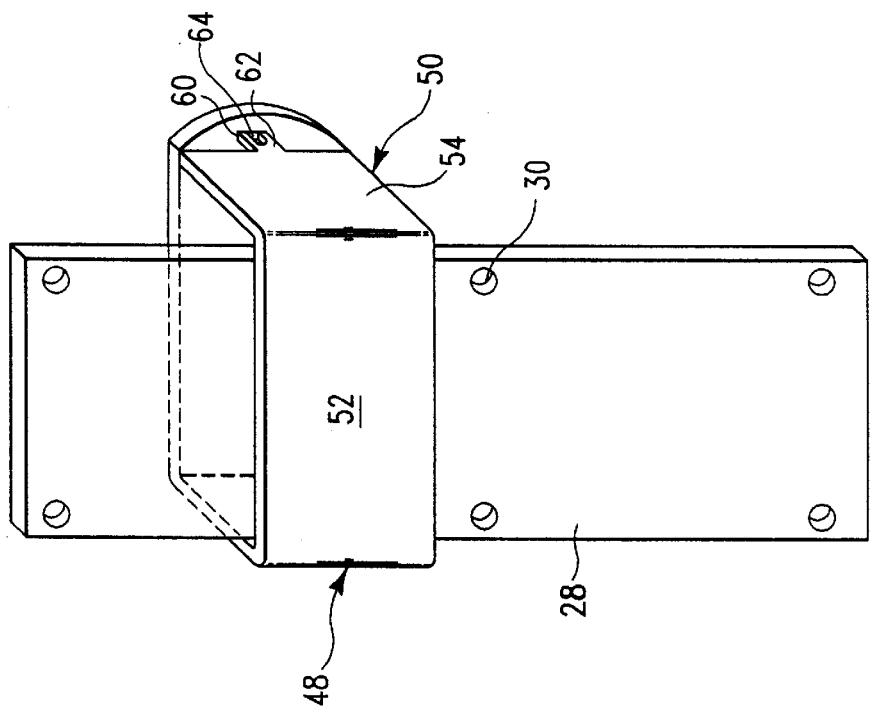
Figure 9:
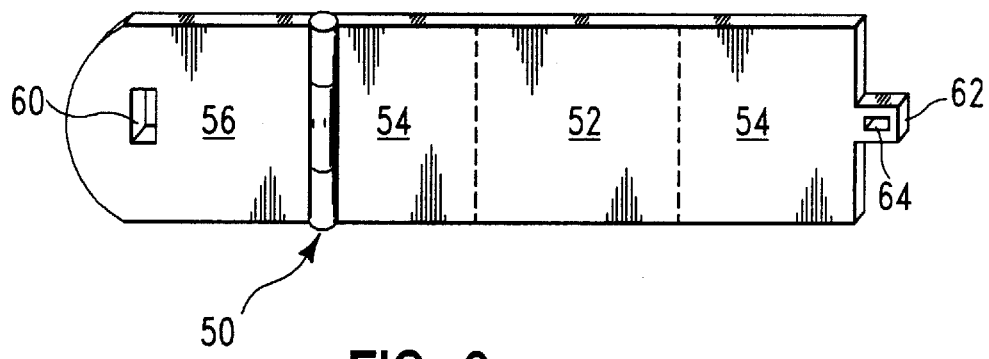
Figure 8:
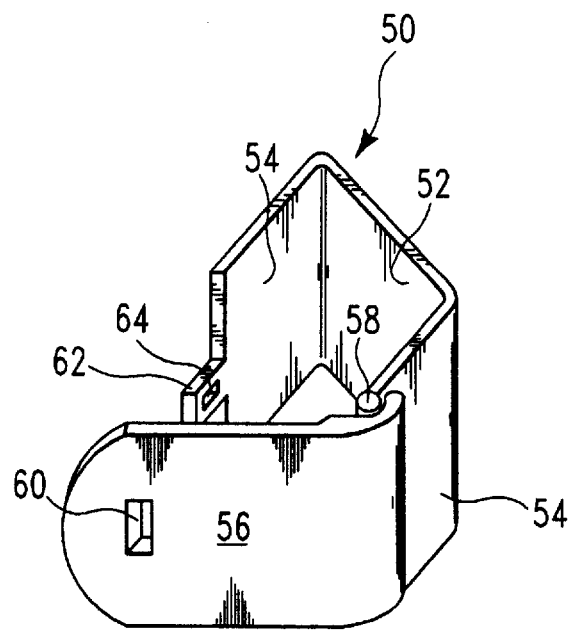
Figure 10:
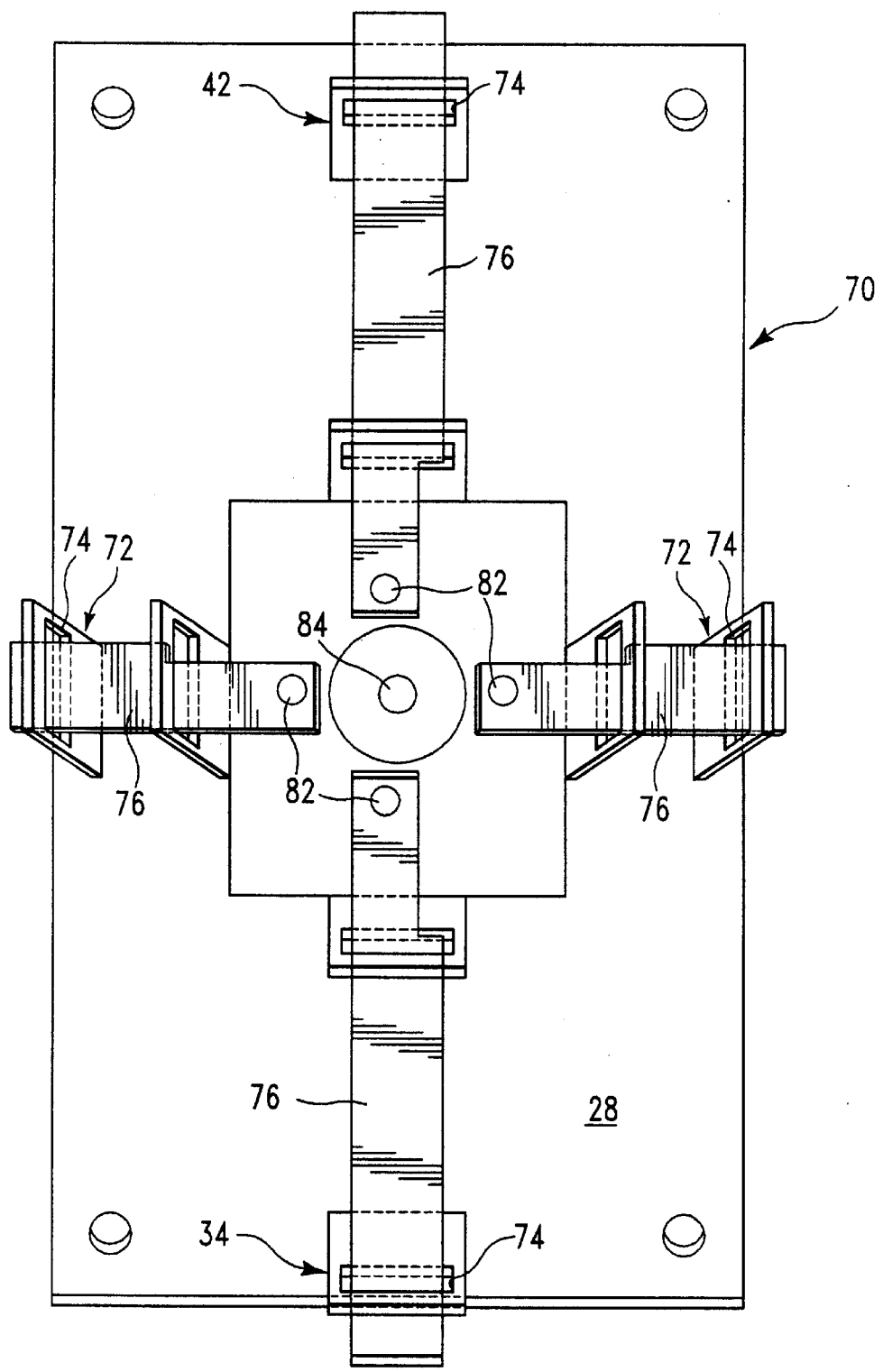
Figure 11:
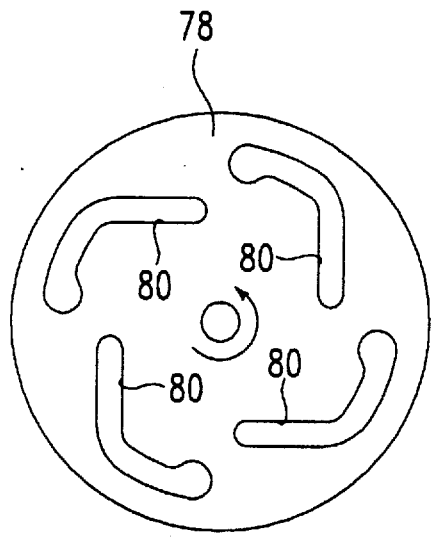
Figure 13:
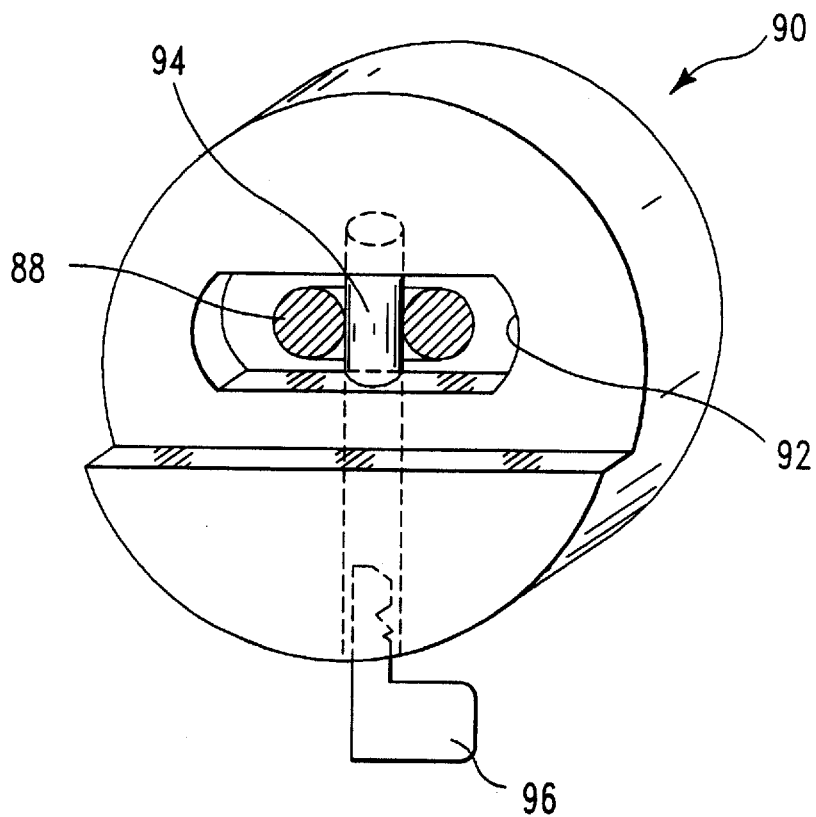
Figure 12:
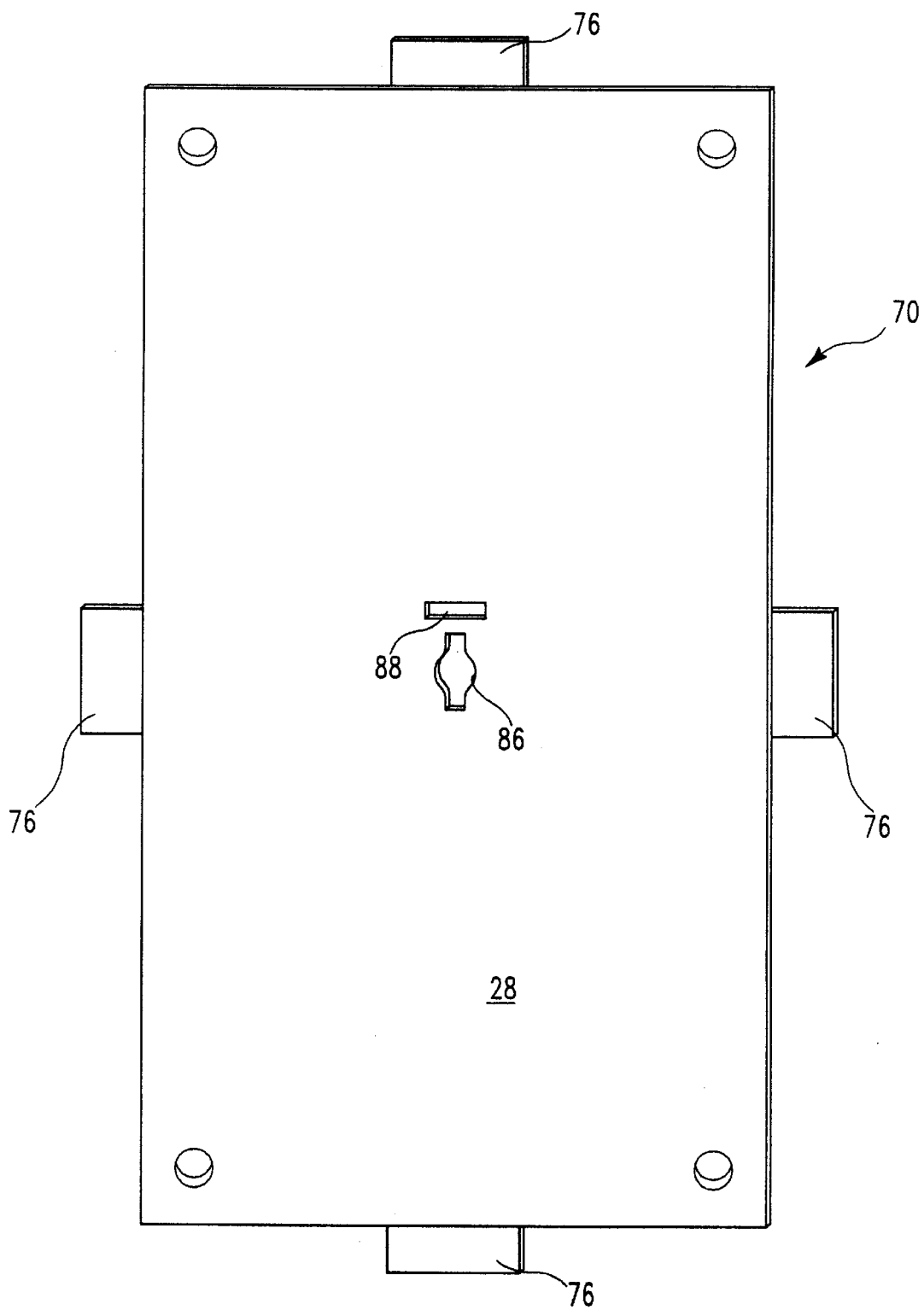

FIG. 5 an enlarged diagrammatic front view in perspective of the apparatus of FIG. 3;

FIG. 6 is a diagrammatic view in perspective of the inside surface of the tough cover of the apparatus of FIG. 5 sans the normally integral band;

FIG. 7 is a right side edge view of the cover of FIG. 6;

FIG. 8 a view in perspective of the rear of the band of the apparatus FIG. 5 before it is welded to the cover of FIGS. 6 and 7;

FIG. 9 an upside-down view of the band of FIG. 8 stretched out, that is before it is bent to form a U-shape portion for embracing the front and sides of the pedestal;

FIG. 10 is a diagrammatic rear view partially in perspective of another apparatus using a tough cover but with different brackets and with bars, to replace the conventional pedestal lower-opening cover to better secure the pedestal wiring against vandalism;

FIG. 11 is an end view of a disc cam for operating the bars of FIG. 10;

FIG. 12 is diagrammatic front view of the another apparatus of FIG. 10 and showing the normal "T" key entry slot and staple for fixedly mounting a lock to overlie the normal "T" key slot; and FIG. 13 is a view in perspective of the staple receiving back of a conventional lock employed with the apparatus and staple of FIG. 12.

DETAILED DESCRIPTION OF PREFERRED EMBODIMENTS OF THE INVENTION

Figure 2A:
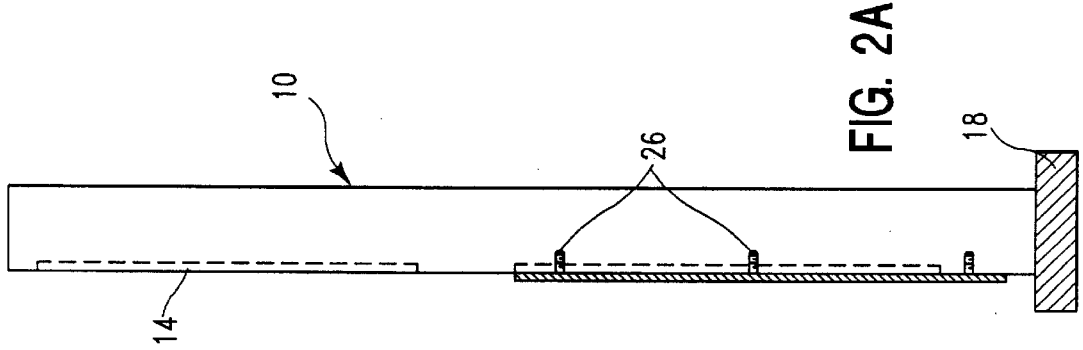
FIG. 2 is a diagrammatic left side view of the pedestal of FIG. 1 with a normal aluminum cover secured by six screws for closing off the front low opening.
Figure 1:
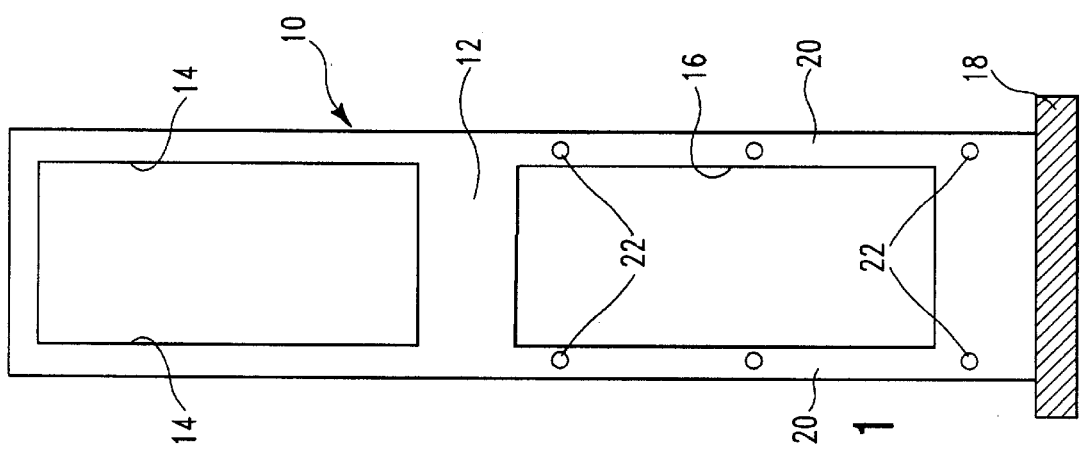
FIG. 1 is a diagrammatic front view of a conventional public payphone pedestal or post resting on a base and having an upper opening for mounting the payphone and a lower opening for providing access to the powering and communication wiring for the payphone.
Figure 2:
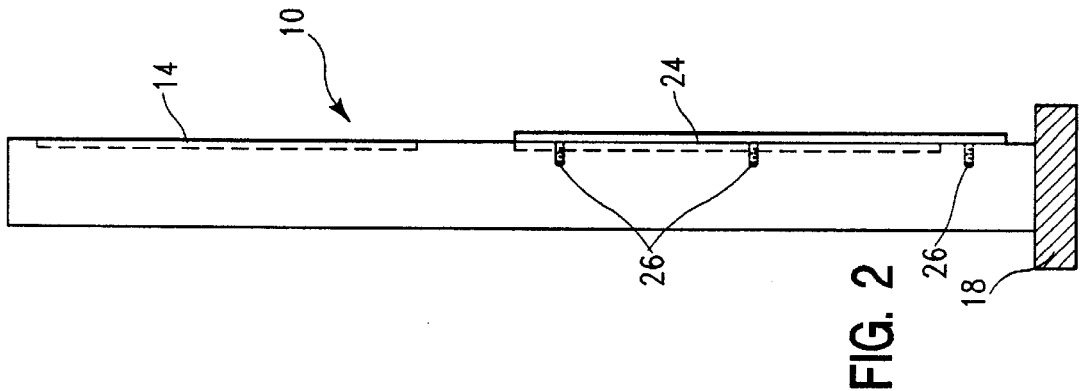

Referring now particularly to the drawings, there is shown in FIGS. 1–3 a conventional pedestal generally indicated by the numeral 10 for a public coin-operated telephone or payphone. The pedestal is rectangular in cross-section and includes a front 12 having an upper opening 14 to a compartment wherein a pay phone is mounted so as to be somewhat protected from the environmental elements. The front 12 also has a lower opening 16 to a compartment wherein the wiring for the payphone and pedestal are brought up from beneath through a base 18 supporting the pedestal 10 in a fixed position.

The lower opening 16 is surrounded by the inside edges of a rim 20 constituting part of the pedestal 10, and is provided to each side of the opening 16 with three spaced-apart threaded screw holes 22. An aluminum plate 24 having on each of two sides three spaced-apart holes for freely passing threaded screws 26 is conventionally employed to close off the opening 16.

A steel divider; not shown, securely divides the upper compartment of the pedestal from the lower one.

First Preferred Embodiment of the Invention

FIGS. 3–9 disclose the first preferred embodiment for securing the contents of the bottom of a pedestal more effectively. In this embodiment, the conventional aluminum cover plate 24 (FIG. 2) is replaced by a stainless steel plate 28. The stainless steel plate 28 too is formed on each of two sides three spaced-apart holes 30 for freely passing stainless steel threaded screws 32 received in the conventionally threaded holes 22 to each side of the opening 16 in the bottom of the pedestal 10.

The inside surface (FIGS. 6 and 7) of the stainless steel plate 28 mounts two brackets, upper and lower, to prevent up and down jockeying of the plate as vandals endeavor to loosen it to where they might insert a crow-bar or the like between the plate 28 and the pedestal 10. The lower, a rim-receiving bracket generally indicated by the numeral 34 embraces by being slid down upon the lower horizontal portion of the rim 20 when the plate 24 is placed to close off the opening 16. It is shown as comprising two vertical extending portions 36 and 38 offset by a horizontal portion 40. The vertical portion 36 is welded to the inside surface of the plate 28. The other vertical portion is spaced from the inside surface by the offset 40 a distance approximating the thickness of the rim 20 and opens downward to receive it and set upon it to essentially define the vertical position of the plate 28 in its closed position with respect to the pedestal bottom opening 16 and to prevent downward movement of the plate when fully installed. It also helps secure the bottom of the plate 28 against outward movement.

The upper, a shelf bracket generally indicated by the numeral 42, includes a shelf 44 which rests against the edge of the portion of the rim 20 about the upper end of the bottom opening 16 in the closed position of the plate 28. It also includes an angled portion 46 which is suitably welded to the inside surface of the plate 28 so that the shelf 44 is swung into a rim engaging position when the opening 16 is closed by the plate 28 to prevent upward movement or jockeying of the plate.

Figure 4:
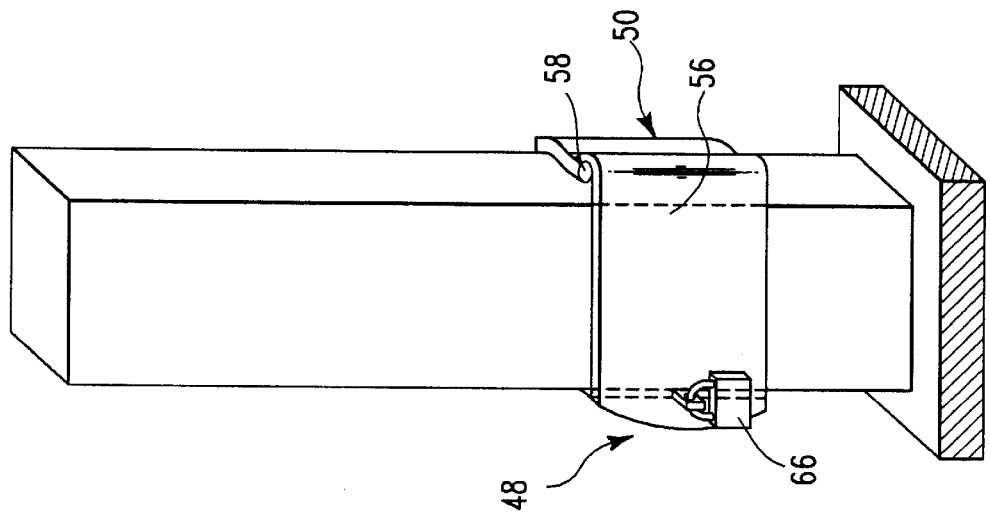
FIG. 4 is a diagrammatic rear view in perspective of the pedestal and apparatus of FIG. 3.

Sidewise jockeying of the plate 28 in its opening 16 closing position is prevented by a mechanism (FIGS. 3–5, 8 and 9) generally indicated by the numeral 48 which embraces the plate 28 and the pedestal 10. The mechanism 10 includes a U-shaped structure generally indicated by the numeral 50 which embraces the front and sides of the pedestal. The U-shaped structure 50 includes a bight portion 52 which extends across the front of the pedestal and is welded to the plate 28, and two legs 54 which extend along the sides of the pedestal. The mouth of the U-shaped structure 50 is closed off by a bar 56 which is hinged at 58 to the free end of one of the legs 54 and extends across the back of the pedestal (FIG. 4). The free end of the bar 56 extends beyond the other leg 54 of the U-shaped structure 50 where it is slotted at 60 to receive through it a protuberance 62 at the end of the leg 54. The free end of the protuberance 62 extends through the slot 60 and itself is slotted at 64 to receive a padlock shackle 66 (FIG. 4).

It will be appreciated that the legs 54 of the U-shaped structure prevent sidewise jockeying of the plate 28 by virtue of their engagement with the sides of the pedestal and the welding of the plate 28 to the structure bight 52. Outward movement of the plate 28 is also prevented by the mechanism 48 by virture of the mechanism bar 56 engagement with the back of the pedestal and its hinged and locked connection to the structure 50.

In installation, after the structure 50 has been welded to the plate 28, the plate inside-surface lower bracket 34 is first seated on the rim 20. Then the upper end of the plate is swung into closed position where the shelf bracket engages the rim 20 and the legs 54 of the mechanism embrace the sides of the pedestal. Then the screws 32 inserted to mount the plate in place. Then the bar 56 hinged at the free end of one U-shaped structure leg 54 would be swung against the back of the pedestal to where its slot 60 receives and passes through the protuberance on the free end of the other leg 54. The shackle 66 of a padlock would then be placed in the protuberance slot 64 and the padlock closed to secure the plate 28 in place securely against jockeying in all directions and further against outwardly.

Second Preferred Embodiment of the Invention

A second preferred embodiment of the invention generally indicated by the numeral 70, is shown in FIGS. 10–13. In this embodiment, four brackets are employed to prevent sidewise jockeying of the stainless steel plate 28. Thus not only are brackets 34 and 42 mounted on the inside surface of the plate 28 which engage the rim 20 of the opening 16 to prevent up and down jockeying of the plate with respect to the pedestal 10, but also left and right side brackets generally indicated by the numeral 72 to prevent sidewise jockeying. These brackets 34 and 42 and 72 differ from those of the first embodiment by being slotted at 74 to receive slidably bars 76 which may be moved outwards therethrough to locking positions in which they engage the inside surfaces of the rim 20. Then the bars are moved outward, they prevent outward jockeying of the plate 28 from its closed position in which it would be mounted by the screws 26.

The bars 76 are moved to and from their locking positions by mechanism which includes a disc 78 cam-slotted at 80. The cam slots 80 interact with pins 82 on the inner ends of the bars 76. Rotation of the disc 78 moves the bars in and out via the slots 80 acting upon the pins 82.

The disc 80 is mounted on a rotatable shaft 84 so as to be rotatable therewith. The shaft 84 is rotatably mounted on the inside surface of the plate 28 and formed at its outer end adjacent the plate 28 with a "T" key slot (not shown) in line with a "T" key slot 86 in the plate 28.

The embodiment 70 is further protected against vandalism by a lock arrangement which prevents access to the "T" key slot. To this end a staple 88 projects outwardly above the "T" key slot 86 from the outside face of the plate 28 to be received within a grooved lock (Federal 400D) generally indicated by the numeral 90 (FIG. 13) and which extends downward to cover the slot 86 to prevent insertion therein of a "T" key equivalent and its effective use to unlock the steel plate for removal. The lock 90 has a groove 92 which receives the staple 88. It is secured in place by a bolt 94 which extends inside the staple in the locked position in which it is controlled by a key 96.

In installation, the installer would first make sure that all of the bars 76 were retracted. He would then place the plate 28 against the opening with the brackets 34, 42 and 72 engaging the inside edge of the opening 16, and mount it with screws 26. He would then insert the "T" key to more the bars 76 outward behind the rim 20 through rotation of the cam disc 78. He would then place the lock 90 on the staple 88 and remove the key 96, the lock thereafter covering the "T" key slot 86.

While applicants have shown preferred embodiments of the invention, it will be appreciated by those skilled in the art that other and different embodiments may be made using the principles of the invention. It is therefore desired to be limited only by the scope or spirit of the appended claims.

What is claimed is:

1. In an apparatus for protecting against vandalism the powering and communication wiring in the bottom of a public payphone pedestal having an upper opening for receiving a telephone and a bottom opening for accessing the wiring for maintenance purposes and surrounded by a rim bearing an edge and an outside surface, a tough plate for closing off said bottom opening and engaging via its inside surface the outside surface of the rim, a bracket mounted on the bottom side of the inside surface of said plate for engaging the rim of said opening when the plate inside surface engages the outside surface of the rim to prevent movement of the plate towards that bottom side, another bracket mounted on the upper side of the inside surface of the plate for fitting against the edge of the rim when the plate inside surface engages the outside surface of the rim to prevent movement of the plate towards that upper side, and a mechanism for holding the inside surface of the plate against the outside surface of the rim to prevent lateral sidewise and outward movement of the plate.

2. An apparatus according to claim 1, wherein a portion of the bracket on one side of the inside surface of said plate is spaced from the inside surface of said plate to receive the rim inbetween them.

3. An apparatus according to claim 1, wherein the mechanism is a band which tightly encircles the pedestal.

4. An apparatus according to claim 3, wherein the band includes a U-shaped portion having a bight fixed to the plate and legs embracing the sides of the pedestal.

5. An apparatus according to claim 4, wherein the band also includes a portion bridging the free ends of the legs of the U-shaped portion.

6. An apparatus according to claim 5, wherein the band portion bridging the free ends of the legs of the U-shaped portion is hingedly connected at one end to the free end of a leg of the U-shaped portion and the swinging end is secured to the free end of the other leg of the U-shaped portion by a lock.

7. An apparatus according to claim 6, wherein the lock is a pad lock whose U-shaped bar is received in a hole in a protuberance extending from the adjacent free end of the other leg of the U-shaped portion through a slot in the swinging end of the bridging portion.

8. An apparatus according to claim 7, wherein a portion of the bracket on one side of the inside surface of said plate is spaced from the inside surface of said plate to receive the rim inbetween them.

9. An apparatus according to claim 8, wherein the swinging end of the bridging portion is rounded to provide a portion for forming the slot while minimizing exposure to striking action by vandals.

10. An apparatus according to claim 9, wherein screws are also employed to threadedly secure the plate to the rim of the pedestal.

11. An apparatus according to claim 1, wherein the rim has an inside surface and the mechanism includes slidable bars carried on the inside surface of the plate.

12. An apparatus according to claim 11, wherein slidable bars are slidably supported by respective brackets.

13. An apparatus according to claim 1, wherein screws are also employed to threadedly secure the plate to the rim of the pedestal.

14. In an apparatus for protecting against vandalism the powering and communication wiring in the bottom of a public payphone pedestal having an upper opening for receiving a telephone and a bottom opening for accessing the wiring for maintenance purposes and surrounded by a rim bearing an edge and an outside surface, a tough plate for closing off said bottom opening and engaging via its inside surface the outside surface of the rim, a bracket mounted on one side of the inside surface of said plate for engaging the rim of said opening when the plate inside surface engages the outside surface of the rim to prevent movement of the plate towards that side, another bracket mounted on another side of the inside surface of the plate for fitting against the edge of the rim when the plate inside surface engages the outside surface of the rim to prevent movement of the plate towards that side, and a mechanism for holding the inside surface of the plate against the outside surface of the rim to prevent sidewise and outward movement of the plate, wherein the rim has an inside surface and the mechanism includes movable bars carried on the inside surface of the plate, wherein movable bars are slidably supported by respective brackets, wherein other movable bars are slidably supported in other brackets mounted on other sides of the inside surface of the plate and fitting against the edge of the rim when the plate inside surface engages the outside surface of the rim to prevent movement of the plate towards those sides.

15. An apparatus according to claim 14, wherein the mechanism also includes an instrumentality for simultaneously moving the all of the bars.

16. An apparatus according to claim 15, wherein the instrumentality includes a slotted disc cam and the bars each have a pin received in a corresponding slot in the disc cam.

17. An apparatus according to claim 16, wherein the disc cam is fixed to a end-slotted shaft rotatable from outside the plate by a "T" key.

18. An apparatus according to claim 17, wherein a lock may be mounted on the front surface of the plate to prevent insertion of a "T" key in the end-slotted rotatable shaft.

19. An apparatus according to claim 18, wherein the front surface of the plate mounts a staple received within a 400D lock covering the slotted end of the rotatable shaft.

20. An apparatus according to claim 19, wherein screws are also employed to threadedly secure the plate to the rim of the pedestal.

* * * * *